United States Patent [19]
McLaughlin

[11] Patent Number: 4,944,971
[45] Date of Patent: Jul. 31, 1990

[54] AUTOMOBILE "SUN VISOR SLIP COVERS"

[76] Inventor: John P. McLaughlin, 1387 Grosser Rd., Gilbertsville, Pa. 19525

[21] Appl. No.: 326,739

[22] Filed: Mar. 21, 1989

[51] Int. Cl.⁵ .............................................. B65D 65/22
[52] U.S. Cl. ................... 428/34.9; 296/97.1; 428/192; 428/36.1; 150/154
[58] Field of Search ............ 428/34.9, 35.1, 36.1, 428/192; 264/230; 156/85; 296/97.1; 150/154

[56] References Cited

U.S. PATENT DOCUMENTS

| | | | |
|---|---|---|---|
| 4,014,724 | 3/1977 | Rausing | 428/34.9 |
| 4,095,760 | 6/1978 | Sommer et al. | 156/85 |
| 4,424,243 | 1/1984 | Nishimoto et al. | 428/34.9 |
| 4,432,129 | 2/1984 | Featsent | 264/230 |
| 4,755,403 | 7/1988 | Furguson | 428/34.9 |
| 4,770,911 | 9/1988 | Sengewald | 428/36.1 |
| 4,803,103 | 2/1989 | Pithouse | 428/35.1 |

*Primary Examiner*—James Seidleck
*Attorney, Agent, or Firm*—Terry M. Gernstein

[57] ABSTRACT

A slip cover for use with an automobile sun visor includes a deformable hollow body that has an opening through which the sun visor moves to be encased by the cover. The cover body includes portions that are heat shrinkable and portions that are stretchable. Heat from a hand-held hair dryer, or the like, is applied to the cover to shrink those heat-shrinkable portions to securely encase the sun visor. Indicia, such as advertising material or the like can be placed on the slip cover.

4 Claims, 1 Drawing Sheet

U.S. Patent   Jul. 31, 1990   4,944,971
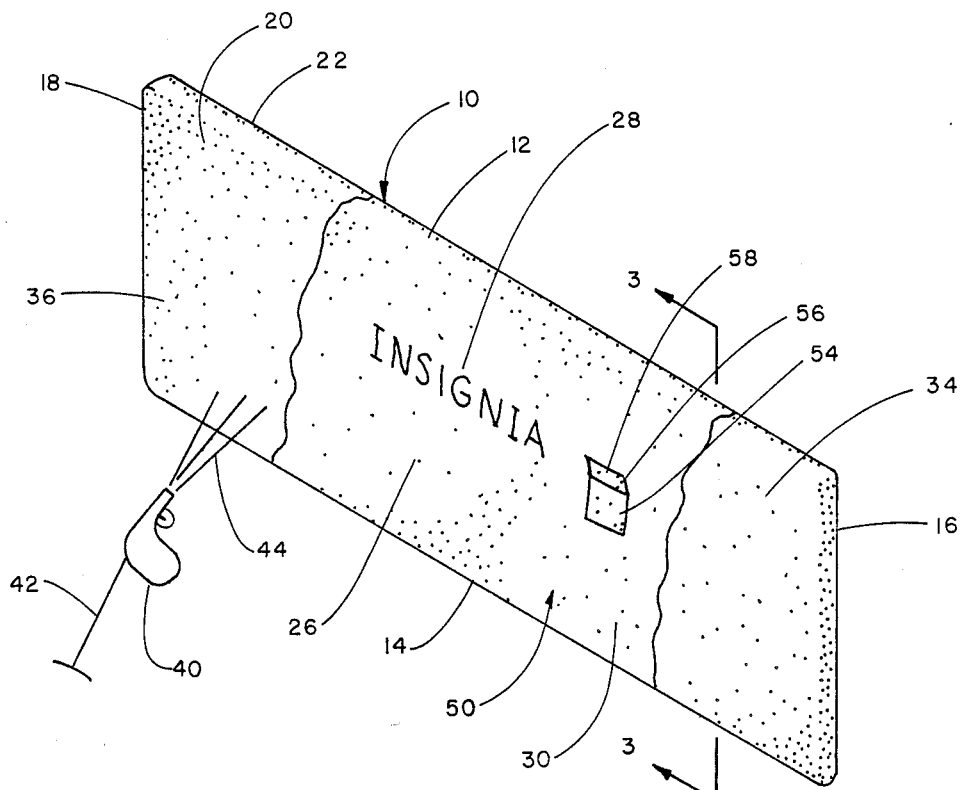
FIG. 1
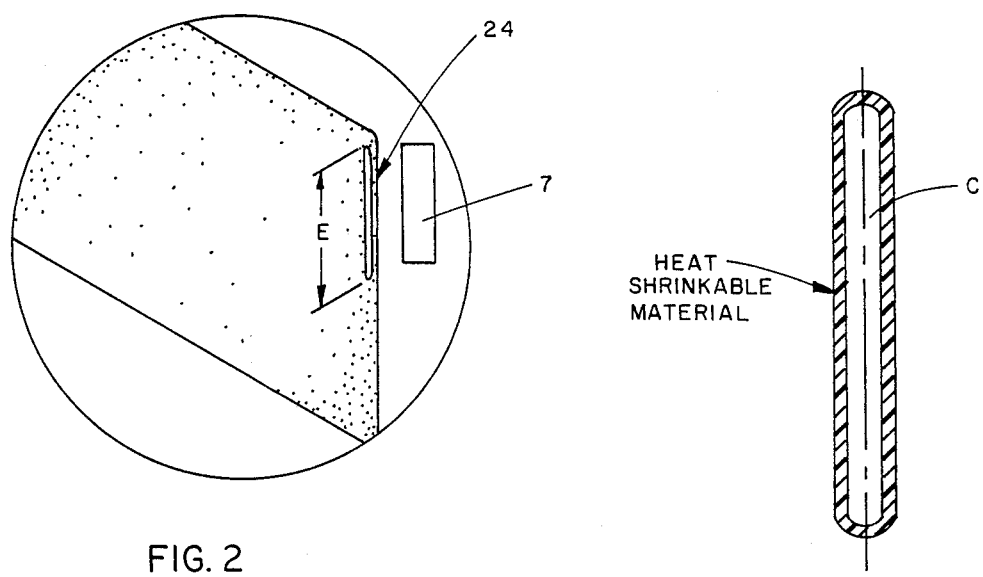
FIG. 2
FIG. 3

AUTOMOBILE "SUN VISOR SLIP COVERS"

TECHNICAL FIELD OF THE INVENTION

The present invention relates to the broad art of land vehicles, and to the particular field of automobile accessories.

BACKGROUND OF THE INVENTION

An automobile sun visor is usually located immediately adjacent to the automobile windshield, and when deployed into a sun-blocking position, is often one of the more noticeable accessories on the automobile both from inside the automobile and from outside the automobile.

Therefore, sun visors can be one of the more noticeable accessories of an automobile. For example, advertising, a slogan or logo could be placed on a sun visor in the manner of a bumper sticker. Yet, the sun visor has been one of the more overlooked accessories with regard to appearance, and the sun visor has been used primarily for its designed function of blocking the sun, with only limited other uses such as holding spare change, maps, glasses and the like.

While useful for such purposes, due to its prominent location, present designs have not taken full advantage of the sun visor of an automobile.

Accordingly, there is a need for a means of making full use of an automobile sun visor.

Still further, when a sun visor becomes worn or damaged, instead of being an eye-catching device, it actually becomes an eye-sore. However, at the present time, there does not appear to be any way to expeditiously repair a worn or damaged sun visor and such accessory is usually replaced in total.

Thus, there is a further need of a means for permitting a worn or damaged sun visor to be expeditiously repaired in any eye-appealing manner.

OBJECTS OF THE INVENTION

It is a main object of the present invention to provide a slip cover for an automobile sun visor that is easily and expeditiously placed onto a sun visor to enable that sun visor to be an eye-catching and appealing accessory.

It is another object of the present invention to provide a slip cover for an automobile sun visor that can be securely positioned on the sun visor.

It is another object of the present invention to provide a slip cover for an automobile sun visor that can be heat shrunk onto the sun visor.

It is another object of the present invention to provide a slip cover for an automobile sun visor that can be sealed after placement onto the sun visor to protect that sun visor.

SUMMARY OF THE INVENTION

These, and other, objects are achieved by a slip cover for use in encasingly covering an automobile sun visor. The slip cover has a hollow body that includes stretchable material, and an opening through which the sun visor passes to be encased in the cover. The stretchable nature of the slip cover eases its placement onto the sun visor.

Selected portions of the cover are heat shrinkable upon the application of warm air, as from a hand-held hair dryer, for example. Heat shrinking portions of the slip cover onto the sun visor secures the cover onto the sun visor and closes the opening so that the cover securely encases the sun visor.

The slip cover can have indicia thereon and can be decorative to enhance the eye-appeal of the sun visor.

BRIEF DESCRIPTION OF THE DRAWINGS

FIG. 1 is a perspective view of a slip cover for encasing an automobile sun visor in accordance with the present invention.

FIG. 2 is an end perspective view showing the opening in the slip cover through which the sun visor is received.

FIG. 3 is a view of the slip cover taken along line 3—3 of FIG. 1 and showing the heat shrinkable nature of the slip cover.

DETAILED DESCRIPTION OF THE PREFERRED EMBODIMENT OF THE INVENTION

Shown in FIG. 1 is a slip cover 10 for use in covering an automobile sun visor. The slip cover 10 has a shape that generally matches that of the sun visor, and thus is elongate and includes two longitudinal side edges 12 and 14 and two end edges 16 and 18 all bordering central body having a first surface 20 and a second surface 22. The sun visor will have a prescribe width and length, and thus the cover 10 has a length as measured between the two end edges 16 and 18 and a prescribed width as measured between the two side edges 12 and 14 that corresponds to the width and length of the sun visor. The dimensions of the cover may be slightly different from those of the sun visor as will be evident from the ensuing discussion. The visor cover shown in FIG. 1 is rectangular in shape, but could include various protruding portions as necessary to encase sun visors having corresponding shaped sections.

The slip cover 10 is monolithic and is formed of a material that is stretchable, such as a rubberized or plastics-type material. As shown in FIGS. 1 and 2, the cover includes an opening 24 which extends from the side edge 12 to a location that is spaced from the side edge 14. The opening 24 has an undeformed axial extent E that is shorter than the width of the sun visor; however, the stretchable nature of the cover 10 permits the opening to be sufficiently enlarged to permit the sun visor to be inserted into the cover via the opening 24.

The slip cover 10 also includes an area 26 on the outer surface thereof on which suitable indicia 28, such as advertising logos or the like, can be placed. Various materials, such as fabric, fleece-type material or the like can be placed on the cover as suitable. A fabric-like material 30 is indicated in FIG. 1.

The hollow cover 10 is placed on the sun visor by stretching the cover to distort the opening 24 sufficiently to permit the sun visor to be inserted into the cover via the cover. Once the sun visor is located inside the cover, the cover deforming force is released, and the cover 10 will snugly encase the sun visor. Suitable sealing strip materials, such as tape T, or the like, are then placed over the opening to close that opening and prevent dirt from moving through the cover onto the sun visor.

As can be seen from the foregoing, the dimensions of the unstretched and undeformed cover 10 are suitable so that once the sun visor is placed inside the cover, the cover will snugly fit about and encase the visor. Those skilled in the art will understand what dimensions are required to fulfill this function.

As shown in FIGS. 1 and 3, the body of the cover 10 is hollow to include a chamber C which receives the sun visor, and can include selected portions 34 and 36 adjacent to the end edges 16 and 18 respectively. These selected portions 34 and 36 are formed of material, such as plastic-wrap type material or the like, that is shrinkable upon the application of warm air such as generated by a hand-held hair dryer 40. The hair dryer 40 is powered via a cord 42 and generates warm air 44 which is directed against the selected portions after the sun visor is located inside the cover to shrink such portions. Shrinking the portions 34 and 36 will securely encase the cover about the sun visor with as much security as desired. It is noted that the fabric material 30 is fixed to the cover in the area between portions 34 and 36.

Application of heated air to the selected portion 34 will also close the opening 24. However, additional closing material, such as the aforementioned tape T, or a heat sealable type material, can also be placed on the opening and application of warm air to that covering material will sealingly close the opening.

The body of cover can be formed of a combination of the stretchable material and heat shrinkable material. For example, the cover can include stretchable material in certain areas such as area 50, and heat shrinkable material in the above-mentioned selected areas 34 and 36. Such a combination cover will have great versatility.

Use of the heat shrinkable cover is similar to the above-described stretchable cover in that the cover is placed over the sun visor via the opening 24, adjusted as desired, and heated using the hair dryer 40 in appropriate locations to secure the cover on the sun visor. The opening is then closed either by direct application of heated air to the body of the cover adjacent to the opening or by applying a sealing material and applying any necessary heat and/or pressure to that sealing material.

In addition to the indicia, alternative forms of the cover 10 include pockets 54 having closure flaps 56 thereon. The closure flaps include fasteners 58 so that change or the like can be stored in the pockets.

It is to be understood that while certain forms of the present invention have been illustrated and described herein, it is not to be limited to the specific forms or arrangement of parts described and shown.

I claim:

1. A cover for use on an automobile sun visor having a length and a width, comprising:

a monolithic hollow body which includes end edges and side edges and which is formed of stretchable material that is heat shrinkable upon application of warm air from an element such as a hand-held hair dryer in selected locations, with such selected locations being located only adjacent to said body end edges with areas between said end edges being resistant to heat-induced shrinking, said body having an unstretched and unshrunk shape that corresponds to a shape of an automobile sun visor and having an elongated opening defined through one end edge thereof, said body material being a plastic wrap type material that is stretchably deformed to permit the sun visor to be inserted into the hollow body through the opening, and being shrinkable upon the application of warm air thereto to the dimensions of the sun visor positioned inside said body to snugly encase such sun visor, said opening extending from one of said side edges to a location spaced from the other of said side edges and being smaller than the width of the sun visor so that the cover must be deformed to permit the sun visor to pass through said opening into said hollow body;

fabric material fixed to said body in the area between said selected locations, said fabric material including pockets.

2. The cover defined in claim 1 further including closure fasteners on said pockets.

3. The cover defined in claim 1 where the opening is closable by application of heat or by use of a sealing material which is fusable to said body material.

4. The cover defined in claim 3 wherein said fusible material fuses upon application of warm air thereto.

* * * * *